US009077620B2

(12) United States Patent
Thoren et al.

(10) Patent No.: US 9,077,620 B2
(45) Date of Patent: Jul. 7, 2015

(54) METHOD FOR MONITORING A PROCESS AUTOMATION TECHNOLOGY NETWORK

(75) Inventors: Werner Thoren, Steinen (DE); Jörg Reinkensmeier, Steinen (DE); Ulrich Kaiser, Basel (CH)

(73) Assignee: Endress + Hauser Process Solutions AG, Reinach (CH)

( * ) Notice: Subject to any disclaimer, the term of this patent is extended or adjusted under 35 U.S.C. 154(b) by 1010 days.

(21) Appl. No.: 12/449,853

(22) PCT Filed: Apr. 7, 2008

(86) PCT No.: PCT/EP2008/054125
§ 371 (c)(1),
(2), (4) Date: Mar. 10, 2010

(87) PCT Pub. No.: WO2008/125526
PCT Pub. Date: Oct. 23, 2008

(65) Prior Publication Data
US 2010/0204959 A1    Aug. 12, 2010

(30) Foreign Application Priority Data

Apr. 13, 2007  (DE) .......................... 10 2007 017 923
Nov. 15, 2007  (DE) .......................... 10 2007 054 925

(51) Int. Cl.
*G06F 15/173* (2006.01)
*H04L 12/26* (2006.01)
(52) U.S. Cl.
CPC .. *H04L 43/0805* (2013.01); *G05B 2219/31132* (2013.01); *G05B 2219/31135* (2013.01)

(58) Field of Classification Search
USPC ........ 709/224; 702/186; 713/1; 345/3.1, 520; 714/47.2
See application file for complete search history.

(56) References Cited

U.S. PATENT DOCUMENTS

| 6,449,715 B1* | 9/2002 | Krivoshein ...................... 713/1 |
| 2007/0075916 A1* | 4/2007 | Bump et al. ................. 345/3.1 |
| 2007/0233858 A1* | 10/2007 | Goff et al. ..................... 709/224 |

FOREIGN PATENT DOCUMENTS

| DE | 1 014 706 | 12/1953 |
| DE | 197 15 503 | 10/1998 |
| DE | 101 47 706 | 4/2003 |
| DE | 102 01 021 A1 | 7/2003 |
| DE | 103 13 389 | 10/2004 |
| EP | 0 879 444 | 10/2001 |
| WO | WO 03/056423 | 7/2003 |
| WO | WO 03/058361 | 7/2003 |

* cited by examiner

*Primary Examiner* — Kyung H Shin
(74) *Attorney, Agent, or Firm* — Bacon & Thomas, PLLC

(57) ABSTRACT

In a method for monitoring a network of process automation technology, wherein the network includes a number of field devices, which are connected via a fieldbus with a superordinated unit, there is created for a network application, which analyzes the network, a network description, which corresponds to a device description for field devices. Therewith, the network application can be integrated in a simple manner into a plant monitoring application and status information of the network can be output via the plant monitoring application.

7 Claims, 2 Drawing Sheets

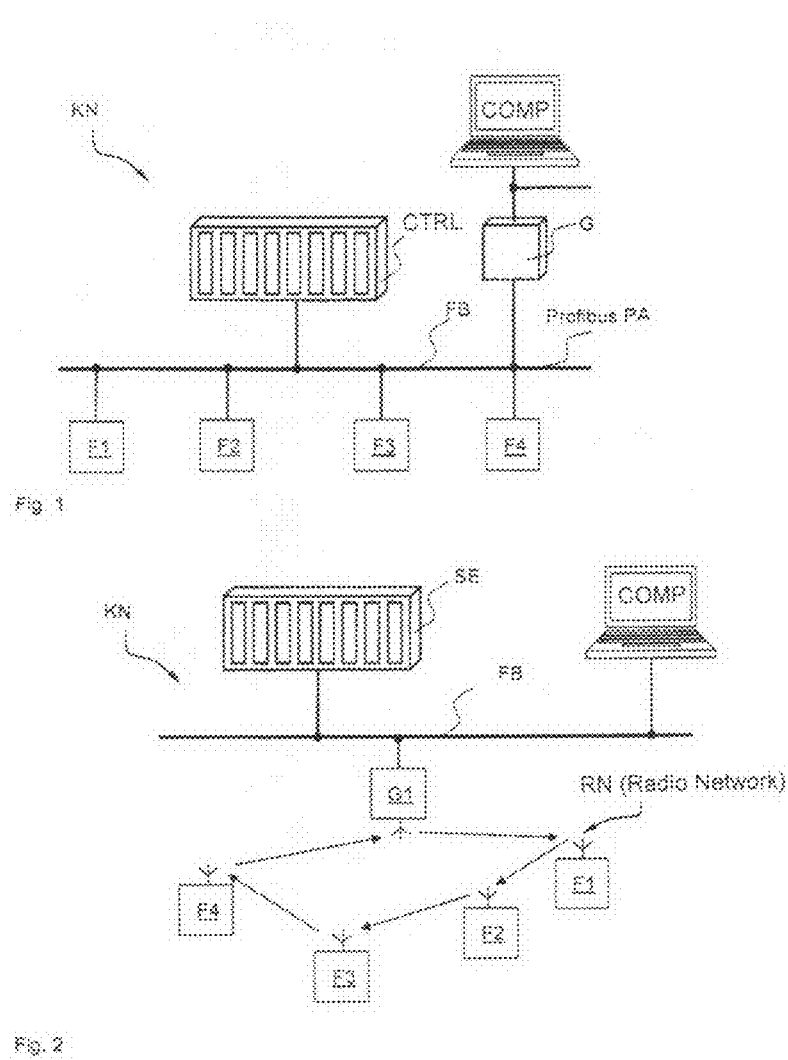

METHOD FOR MONITORING A PROCESS AUTOMATION TECHNOLOGY NETWORK

TECHNICAL FIELD

The invention relates to a method for monitoring a network of process automation technology.

BACKGROUND DISCUSSION

In process automation technology, field devices are often applied, which serve for registering and/or influencing process variables. Examples of such field devices are fill level measuring devices, mass flow measuring devices, pressure, and temperature, measuring devices, etc., which, as sensors, register the corresponding process variables, fill level, flow, pressure, or temperature.

Serving for influencing process variables are actuators, which, for example, as valves, influence the flow of a liquid in a section of pipeline, or, as pumps, the fill level in a container. A large number of such field devices are manufactured and sold by the companies of the firm, Endress+Hauser.

As a rule, field devices are connected in modern automated plants via communication systems, HART, Profibus, Foundation Fieldbus, etc., with superordinated units (e.g. control systems, or control units). These superordinated units can serve for plant control, process visualization, plant monitoring as well as for start-up of the field devices. For servicing field devices, corresponding operating software in the form of operating programs is necessary. These operating programs, which, most often, function also as plant monitoring applications (asset management systems), can run self-sufficiently in a superordinated unit (FieldCare, Endress+Hauser; Pactware; AMS, Emerson; Simatic PDM, Siemens) or, however, also be integrated into control system applications (Simatic S7, Siemens; ABB Symphony, DeltaV, Emerson). As a rule, the integration of field devices in a superordinated unit occurs with the assistance of so-called device descriptions. Such device descriptions exist for the communication systems, HART, Profibus, Foundation Fieldbus.

Recently, field devices have become known, which no longer communicate hardwired with superordinated units, but, instead, wirelessly. Most often, the communication with the superordinated units occurs not exclusively wirelessly. As a rule, the field devices communicate wirelessly with a gateway, which is connected to a fast, cable-bound, data network (e.g. Ethernet).

In the case of radio, or wireless, networks, such can be, for example, self organizing networks, which are designed as MESH networks. In the case of such networks, the communication path between transmitter and receiver is relatively flexible. If e.g. the radio connection between two participants of the network is momentarily disturbed, then the data are forwarded via other participants of the radio, or wireless, network.

For plant safety, the quality of the data transmission in the networks is an important variable. Therefore, network analyzers are already known, which monitor the parameters relevant for the communication in the network, such as hoppings, retries, or the connection quality. These network analyzers are separate units, and the won information can only be displayed and stored in the units themselves.

A simple and secure plant monitoring is not possible with the known network analyzers.

SUMMARY OF THE INVENTION

An object of this invention is, therefore, to provide a method for monitoring a network of process automation technology, which does not have the above named disadvantages, and instead, especially, can be performed with conventional plant monitoring applications.

This object is achieved by a method including the steps of: monitoring a network of process automation technology, wherein the network includes a number of field devices, which are connected via a fieldbus with a superordinated unit, wherein, in the superordinated unit, a plant monitoring application is running, into which field devices are integrated via device descriptions, the method comprising the steps of: creating a network description, which corresponds to a device description for field devices, for a network application, which analyzes the network and generates status information of the network; integrating the network application into the plant monitoring application via the network description; communicating of the plant monitoring application with the network application, which runs in a component of the network; and outputting of status information of the network via the plant monitoring application.

An essential idea of the invention is to associate with the network a network description, which corresponds to a conventional device description for field devices. For monitoring the network, a network application is provided, which runs in a component of the network and which correspondingly analyzes the network as regards the quality of the data transmission. Via the network description, the network application can be integrated in simple manner into a plant monitoring application, which runs in a superordinated unit. Therewith, the plant monitoring application can communicate with the network application, i.e., respectively, fetch, and write, data.

In an embodiment of the invention, the network description is an executable device description, which corresponds e.g. to a DTM (Device Type Manager) according to the FDT specifications.

In an alternative embodiment of the invention, the network description is an interpreter based, device description.

A further option is that the network application analyzes the robustness of the network, or its behavior as a function of time.

In an embodiment of the invention, the network application can run in a gateway, in a network node or in a separate computer unit.

In an embodiment of the invention, the network application can be serviced, i.e., especially, parametered, or configured, in simple manner from a superordinated unit with the assistance of the network description.

An essential idea of the invention is to view a network with a plurality of field devices and their communication connections as an unit and to create for this unit a network description (device description), which describes the functionality of the network, especially from a network analyzing application monitoring the quality of the network.

BRIEF DESCRIPTION OF THE DRAWINGS

The invention will now be explained in greater detail on the basis of an example of an embodiment illustrated in the drawing, the figures of which show as follows:

FIG. 1 a conventional network of process automation technology, in schematic representation;

FIG. 2 a network of process automation technology with a radio network;

DETAILED DISCUSSION IN CONJUNCTION WITH THE DRAWINGS

FIG. 1 shows a network of process automation technology for an automated plant with a cable-bound network KN. Four field devices F1, F2, F3 and F4 communicate via a fieldbus FB with a control unit CTRL. The control unit CTRL is responsible for the process control. Connected with the fieldbus FB via a gateway G is, moreover, a computer unit COMP, as superordinated unit, which serves e.g. for plant monitoring, especially for visualizing the automated plant. The control unit CTRL ascertains, on the basis of current measured values of the sensors, corresponding control signals for the field devices working as actuators. The fieldbus FB can be, for example, a Profibus PA fieldbus.

FIG. 2 shows a network of process automation technology with a radio network RN. The radio network RN comprises a number of field devices F1-F4 as well as a gateway G1. The gateway G1 is connected via a conventional fieldbus FB with a control unit CTRL and a computer unit COMP. The control unit CTRL and the computer unit COMP here correspond to the control unit CTRL unit and computer unit COMP of FIG. 1.

The radio network RN can be a network in MESH technology. In such case, the data transmission paths between the field devices F1-F4 and the gateway G1 are not fixedly predetermined. The field device F1 can, for example, communicate directly with the gateway G1, or, however, in the extreme case, via the field devices F2, F3 and F4 with the gateway G1. Depending on whether "detours" are involved in the data transmission, the data transmission can be more or less delayed.

Figure 3:
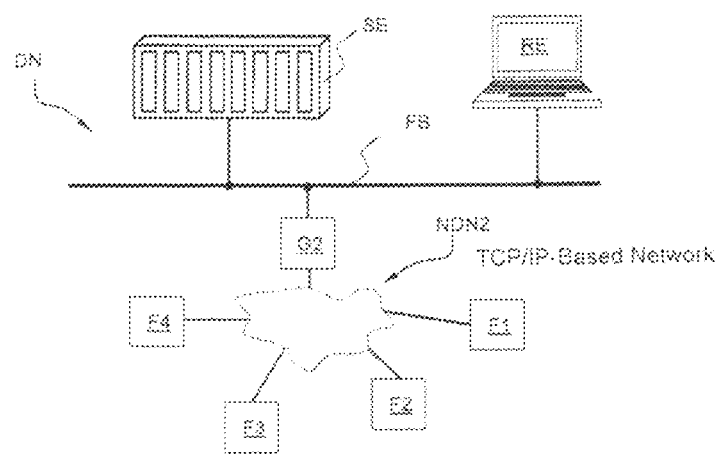
FIG. 3 a network of process automation technology with a TCP/IP based network.

FIG. 3 shows a network of process automation technology with a TCP/IP-based network TN. Also here, four field devices F1-F4 are connected with a gateway G2 via the network TN. FIG. 3 shows the gateway G2 likewise as in FIG. 2 connected with the control unit CTRL and the computer unit COMP via the fieldbus FB. In the case of the TCP/IP-based network TN, such is a non deterministic network, because collisions can occur in the data transmission, or detours are necessary, or multiple attempts (retries) are necessary in the data transmission.

Figure 4:
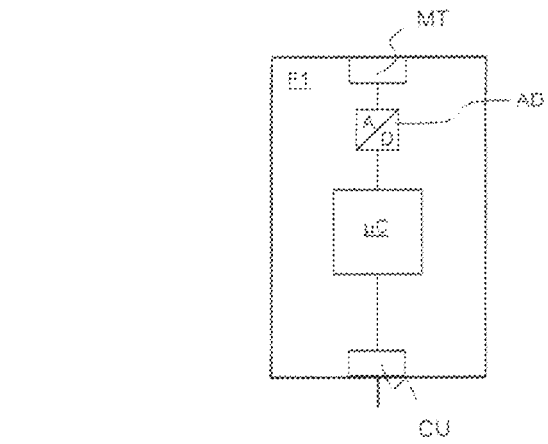
FIG. 4 a field device in schematic representation.

FIG. 4 shows a field device, for example, the field device F1, schematically. It includes a measuring transducer MT, which serves for registering a process variable. The analog measurement signal delivered by the measuring transducer MT is digitized in an analog-digital converter A/D and forwarded to a microcontroller µC. In the microcontroller µC, the measurement signal is processed and converted into a measured value. Via a correspondingly embodied communication unit CU, which is likewise connected with the microcontroller µC, the field device F1 can communicate either via the fieldbus FB or via one of the two networks RN, or TN. For communication via the fieldbus FB, a fieldbus interface is required. For communication via a radio network, a corresponding radio interface, and, respectively, via a TCP/IP-based network e.g. an Ethernet interface, are required.

In the following, the method of the invention will now be explained in greater detail. In the computer unit COMP, as superordinated unit, runs a conventional plant monitoring application. The plant monitoring application serves for monitoring the automated plant, especially the functions of the field devices F1-F4. If malfunctions occur in the case of the field devices F1-F4, then these are shown to the user via the plant monitoring application on the computer unit COMP. The field devices F1-F4 are integrated into the plant monitoring application in usual manner via device descriptions. According to the invention, in a first method step, a network description, which corresponds to a device description for field devices, is created for the network KN, RN, or TN, especially for a network application, which analyzes the network KN, RN, or TN and which generates status information, for the network KN, RN, TN. In a second method step, the network application is integrated, with the assistance of the network description, into the plant monitoring application. With the assistance of the network description, the entire functionality of the network KN, RN, or TN is made known to the plant monitoring application. Via the network description, a simple communication of the plant monitoring application with the network application running in a component of the network KN, RN, or TN, e.g. the gateway G, G1, or G2, is possible. This network application serves essentially for analyzing the network KN, RN, or TN as regards its faultless functioning. Corresponding status information of the network is transmitted from the network application to the plant monitoring application and to the computer unit COMP.

The network description can be, for example, an executable device description corresponding to the FDT specifications. Such device descriptions are also referred to as DTMs (Device Type Manager).

Alternatively, the network description can be an interpreter based, device description, such as, for example, a Device Description (DD), or an Electronic Device Description (EDD). With the help of the network application, for example, the robustness of the network KN, RN, or TN can be analyzed.

Another option is to analyze, with the network application, behavior of the data transmission as a function of time in the network KN, RN, or TN.

The network application can also run in a separate computer unit connected with the fieldbus FB. The network application can, moreover, also be provided in an additional network node of the networks KN, RN, or TN.

Via the network description, the network application can easily be parametered and configured from the computer unit COMP with the assistance of the plant monitoring application.

The method of the invention permits, for the first time, not only individual field devices to be monitored and managed as "assets" in a superordinated unit, but, instead, now a whole network of a plurality of field devices.

Used as plant monitoring application can be a conventional asset management system, which runs self-sufficiently or is integrated in a control system.

The invention claimed is:

1. A method for monitoring a network of process automation technology, wherein the network is a unit that includes a plurality of field devices and their communication connections, wherein the field devices are connected via a fieldbus with a superordinated unit, and wherein, in the superordinated unit, a plant monitoring application is running, into which field devices are integrated via device descriptions according to one of the standards IEC 61804, EDDI, DTM or FDI, the method comprising the steps of:

creating an interpreter based network description file that describes the plurality of field devices and their communication connections as a unit, wherein the unit describes the functionality of the network, wherein the network description file is of the same type as the device description used for the integration into the superordinated unit, wherein the network description file is used for creating a network application;

integrating the network application into the plant monitoring application via the network description file so that the network application is running in the superordinated unit, wherein the network application analyzes the network and generates status information of the network, which network description file is associated with the network;

communicating of the plant monitoring application with the network application, which runs in a component of the network and analyzes the network associated with it as regards the quality of the data transmission; and outputting of status information of the unit via the plant monitoring application.

2. The method as claimed in claim 1, wherein:
the device description is an executable device description.

3. The method as claimed in claim 1, wherein:
the device description is an interpreter based, device description.

4. The method as claimed in claim 1, wherein:
the network application analyzes robustness of the network.

5. The method as claimed in claim 1, wherein:
the network application analyzes behavior of the network as a function of time.

6. The method as claimed in claim 1, wherein:
the network application runs in a gateway, in a network node or in a separate computer unit.

7. The method as claimed in claim 1, wherein:
the network application is parametered and configured from the superordinated unit via the network description.

* * * * *